United States Patent [19]

Karras et al.

[11] Patent Number: 4,849,971
[45] Date of Patent: Jul. 18, 1989

[54] CARRIER TELEPHONE SERVICE ANALYSIS SYSTEM

[75] Inventors: Ernest Karras, Oakbrook; Peter J. Chiodras, Downers Grove, both of Ill.; John M. Harrison, Epsom, N.H.

[73] Assignee: Tekno Industries, Inc., Bensenville, Ill.

[21] Appl. No.: 775,624

[22] Filed: Sep. 13, 1985

[51] Int. Cl.⁴ .............................................. H04J 3/12
[52] U.S. Cl. .................................. 370/110.1; 379/114
[58] Field of Search ................. 370/85, 110.1, 90, 13, 370/96; 179/7.1 R, 7.1 TP; 379/92.7, 240, 22, 114, 377, 133, 134, 144; 340/825.08

[56] References Cited

U.S. PATENT DOCUMENTS

| | | | |
|---|---|---|---|
| 4,165,447 | 8/1979 | Bertoglio et al. | 179/7.1 R |
| 4,258,357 | 3/1981 | Browell | 379/33 |
| 4,371,258 | 2/1983 | Ulrich | 179/7.1 R |
| 4,412,101 | 10/1983 | Brown et al. | 179/7.1 R |
| 4,559,416 | 12/1985 | Theis et al. | 179/7.1 R |
| 4,636,584 | 1/1987 | Binkerd et al. | 370/110.1 |
| 4,759,056 | 7/1988 | Akiyma | 379/144 |
| 4,760,592 | 7/1988 | Hensley | 379/7 |

OTHER PUBLICATIONS

Bell System Transmission Engineering; "Digital Channel Bank Requirements and Objectives"; Nov. 1982, pp. 1–40.

*Primary Examiner*—Douglas W. Olms
*Assistant Examiner*—Frank M. Scutch, III
*Attorney, Agent, or Firm*—Laff, Whitesel, Conte & Saret

[57] ABSTRACT

A call completion analysis system may be coupled to monitor any of many different kinds of telephone transmission equipment which may use any of a great variety of different kinds of signaling methods. At least one of the monitored equipments being a T-type carrier having a plurality of channels. The system receives and analyzes the variety of signals, including signals on any selected ones or all of the T-type carrier channels. At least some of the analyzed signals relate to call initiation, dial digits, duration, call completion and call abandonment conditions. The system gives both machine and human supervision and read out of the analyzed signals. Calls automatically forwarded to common carriers are monitored to insure correct billing by the office furnishing service to the call.

20 Claims, 3 Drawing Sheets

CARRIER TELEPHONE SERVICE ANALYSIS SYSTEM

This invention relates to service analysis systems for telecommunication systems using many different kinds of signaling techniques, and especially for carrier telephone systems, particularly N-type carriers.

Service analysis systems are used in automatic telephone systems to record certain events as they occur, for servicing, billing and maintenance purposes, and to support billings and rate increase proposals required by public utility companies. As will become more apparent, the analysis systems may detect calls to subscribers which should be billed by a local company, but which might be incorrectly billed by another billing entity.

Usually, the observation and analysis equipment is connected to a telehone line or trunk in order to monitor control signals appearing thereon, and to observe the results of such signals (e.g. the number of calls attempted, number of calls completed, number of call busy conditions, number of all trunks busy conditions, etc.). The observed results are then printed out or otherwise stored for an analysis by service personnel. If the print out indicates that systematic errors are occurring, someone will fix the equipment which is malfunctioning. The results of the service analysis may require installation of additional equipment. Also, the results may require billing to recover a fair charge for use of the equipment owned by the company observing the service.

Here, there is a special difficulty because, over the years, the methods of and means for signaling have changed. For example, one signaling method uses "E" and "M" wires. Another signaling method uses dial pulses or "Touch-Tone" signals, or both. There are still other techniques for signaling. Another of the places for analyzing service and billing in a telephone system is on a multiplex of carrier transmission channels. The T-type carrier uses its own signaling techniques. (The expression "T-type carrier" designates a 24-channel telephone carrier system which meets well known "T" standards). Those who are skilled in the art will readily understand that there are still more ways of signaling.

The T-type carrier system requires a detection of four alarm conditions, which are commonly designated SB, C, F, and B2 alarm signals. In addition, the quality of service in the carrier system requires an observation of the bits which make up the binary words for conveying the intelligence of human speech or data transmission. Certain specific signal bits should also be observed. For example, one such specific bit indicates whether a line or channel is busy or idle.

Accordingly, an object of the invention is to provide a service observing system for telephone equipment, in general, and for T-type carrier equipment, in particular. Here, an object is to provide an automatic service analysis system for checking alarm, signal, and intelligence transmission conditions on a carrier system.

Another object of the invention is to detect and correct billing errors.

In keeping with an aspect of the invention, a microprocessor controlled system is designed to provide a means for conducting live or automated service analysis on central office lines, trunks and carrier circuits. The system may be used for local line observing, toll call completion studies, and billing collection or verification on central office trunks. It is only necessary to key-into the inventive equipment the time and date, and an identification of inputs to be observed, plus the disposition parameters. The inventive system monitors dial-pulse or "Touch-Tone" subscriber lines, dial-pulse or multifrequency loop trunks, two or four wire dial pulse, multifrequency E&M trunks, and T-type carrier channels. On outgoing or incoming calls, the system records the unit identification, circuit number, day and time, direction of call, means for providing supervision, type of signaling and the digits dialed. While a call is in progress, the inventive system monitors the audio tones and answer supervision to determine the final disposition and total duration of the call. Upon the completion of a successful detection, a call completed-record is printed out on either a local or a remote teleprinter, or is stored in a solid state memory for polling to a remote computer. These records may provide a basis for billing subscribers for services given them.

A preferred embodiment of the invention is seen in the attached drawings, wherein:

FIG. 1 shows that part of a telephone system which illustrates how the invention solves a billing problem which has appeared since the break-up of the telephone company which provides most of the telephone services in the United States.

Figure 1:
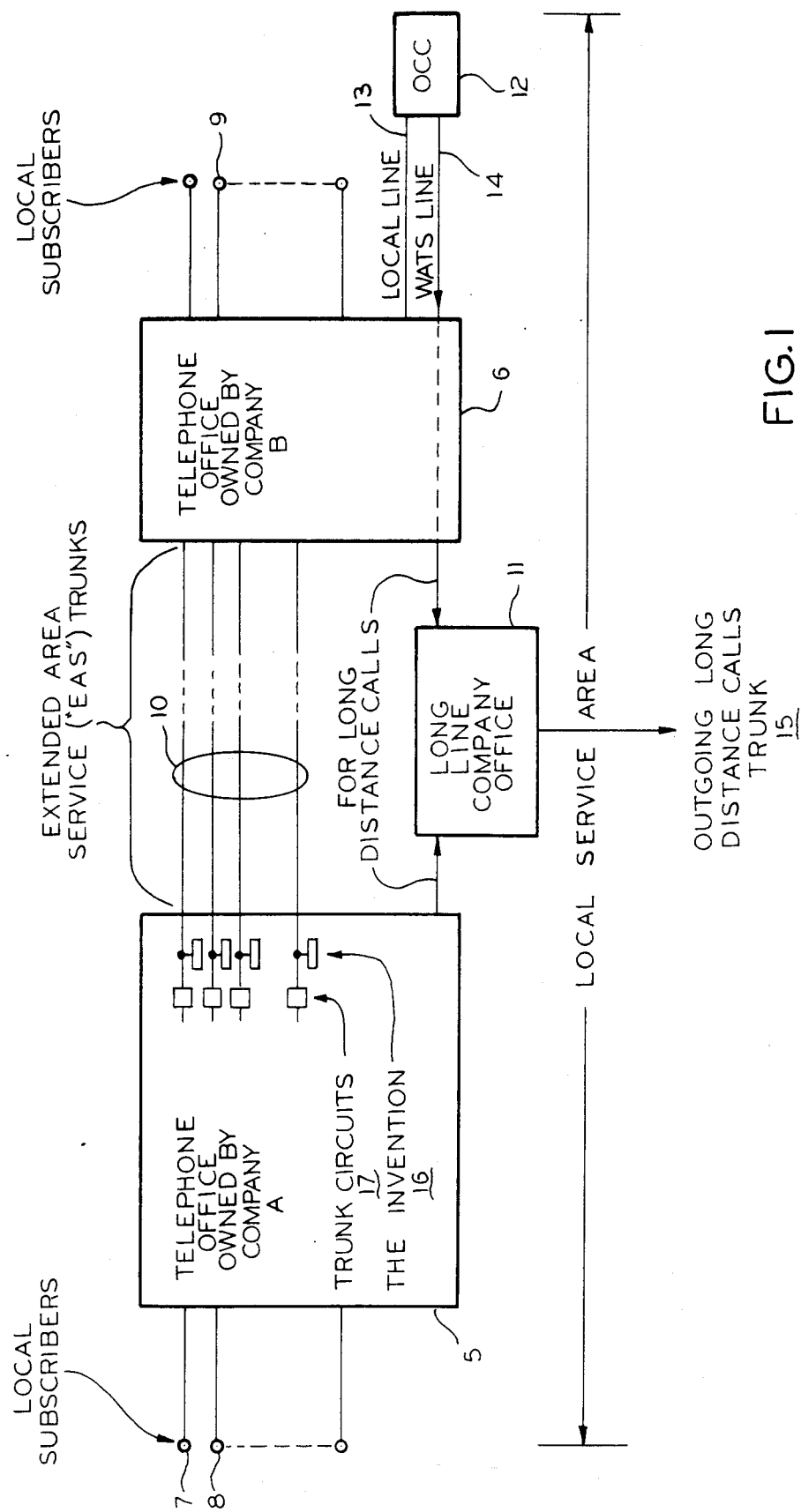
FIG. 1 is a block diagram of a telephone system which illustrates how the invention may be used to correct certain billing errors relating to long distance service given via extended area service trunks.

A local service area may include many offices, two of which are shown at 5, 6. All calls within a single local area carry the same local charges. That is, subscriber 7 may call either of the subscribers 8 or 9 for the same local charge. Therefore, there is no toll ticketing or other equipment which is sometimes supplied to keep track of calls subject to special charges.

It is not important whether the offices 5, 6 are owned by one or more companies since the same accounting problems occur regardless of ownership. However, to highlight the problem, it is here assumed that office 5 is owned by company A and office 6 is owned by company B. Another office 11 involved in only long distance calls is owned by a common carrier company which owns the trunk lines 15 that carry the long distance calls.

The separate offices in the same local service area are interconnected by trunks 10, called extended area service ("EAS") trunks. Thus, if subscriber 7, for example, calls subscriber 9, the call is routed through office 5, over an EAS trunk 10, and through office 6 to subscriber 9. There is no special billing problem since the established rates are structured to take care of this kind of a call with charges distributed on a fair and equitable basis.

A long line company office 11 is owned by an established company for giving common carrier service over long distance trunks 15 during calls to a subscriber who is outside of the local service area. Again, the rates have been set with this common carrier company's business in mind so that there are no special billing problems.

Since the break-up of the company giving nationwide telephone service, many new companies are competing with the long line company for the right to give long distance telephone service. These new companies are sometimes called "other common carrier" ("OCC") companies. To provide this competing OCC service, another common carrier company owning equipment 12, leases one or more local lines 13 from company B for receiving calls in the same manner that a local subscriber 9 receives calls from office 6. The OCC 12 also leases a WATS line 14 over which it may direct the long distance call through office 6 to the office 11 of the long line company. From there, the call is directed over trunk 15 to a distant office, as all long distance calls are directed.

For the right to connect into the conventional telephone system, the company owning OCC equipment 12 pays an access charge to company B because the switching connections are made in office 6. It also pays suitable WATS charges to the long line company owning office 11 and trunk 15.

If the proper procedures for entering the OCC business are followed, the OCC company 12 would also lease lines from company A and make connections into office 5 in the same way that equipment 12 is connected into office 6. Then, company A could make an access charge to recover its costs associated with the use of office 5 equipment by the OCC company. However, the OCC companies do not always have enough business to justify leasing equipment and making connections into every telephone office in the nation. Therefore, if the OCC company 12 sells its services to subscriber 7, for example, the long distance call is routed from subscriber 7, through office 5, an extended area trunk 10, equipment in office 6, local line 13, OCC equipment 12, WATS line 14, equipment in office 6, and the long line company office 11 to an outgoing long distance call trunk 15. In this call, company B and the long line company 11 collect charges based on the call; however, company A gets nothing extra for the long distance call as compared to what it always gets for local calls. Or, stated another way, company B is collecting the access charge that company A should be collecting.

The invention provides observation equipment 16 which may be connected to each of the extended area service trunks 10, in order to monitor calls extended thereover. When the digits of the telephone number identifying the OCC equipment 12 appear on the trunk 10, the invention 16 makes a record of the call and of the time period during which equipment in office 5 is held in the service of the call. That information may provide the basis for billing which company A may then present to company B, which may, in turn, present as part of its bill to the OCC owning equipment 12.

While the foregoing description is presented in terms of three completely separate companies billing each other, the same principles apply even if there is only one company, since allocation and verification of costs are imporant to all public utility companies. Moreover, the OCC company owning equipment 12 should pay some charge as a penalty for its tying up equipment in two offices 5, 6 and an extended area trunk line, as opposed to leasing equipment in office 5 as it is required to do by most established rate structures.

Figure 2:
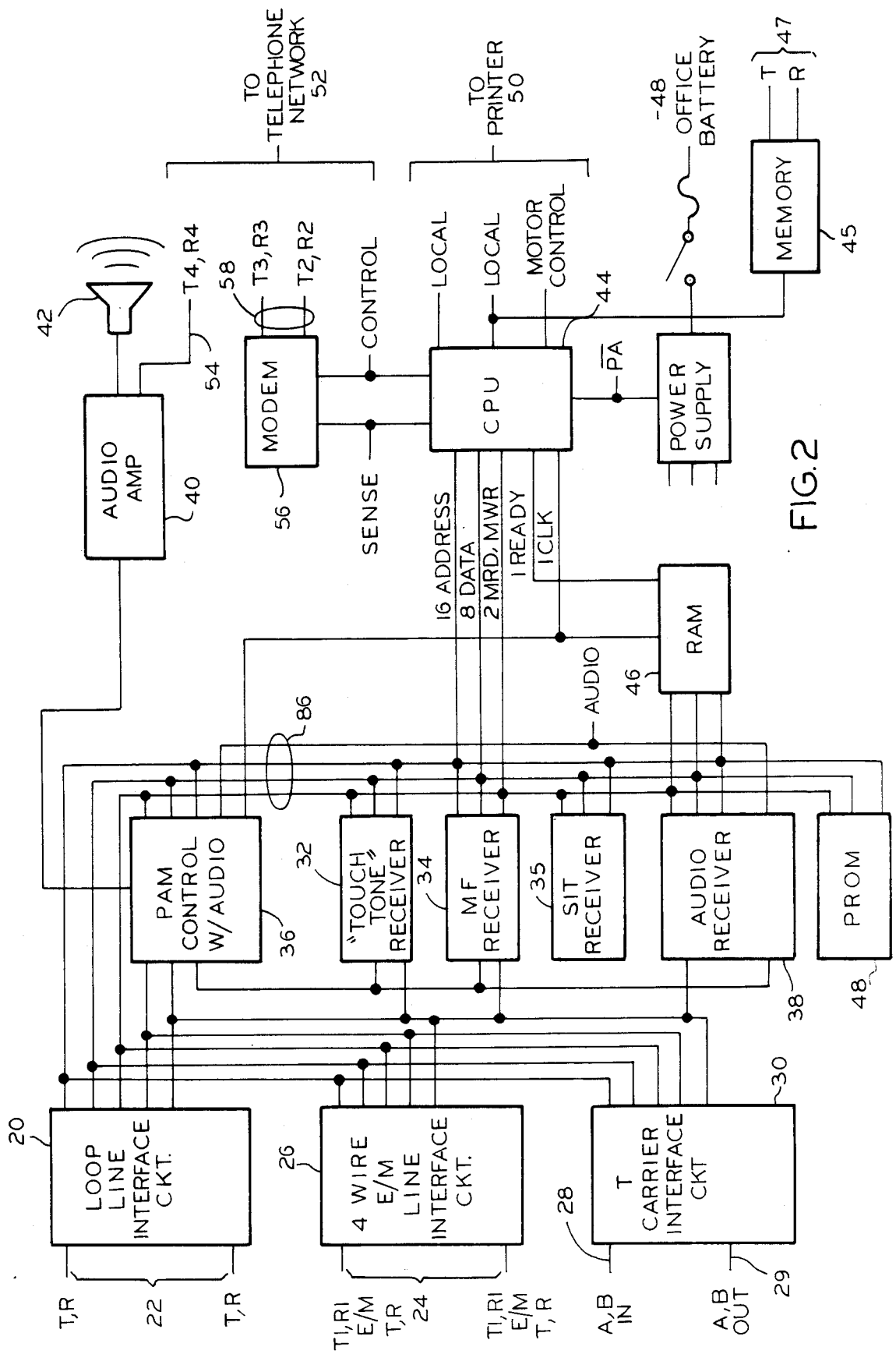
FIG. 2 is a block diagram of the inventive call completion analysis system.

The call completion analysis system of FIG. 2 has a loop line interface circuit 20 which may be connected to any suitable line or lines over a number of incoming tip and ring conductors 22. In this case, the service analysis system of FIG. 2 has the capacity of being connected to one-to-twelve lines. If it is necessary to observe more lines, the equipment of FIG. 2 is duplicated so that more observing systems may be added. The signal (E, M, tip, ring, etc.) wires 24 of the various systems are connected to a second interface circuit 26. All of these are well known wires which are used for signaling in established systems. The A and B in and out signal wires 28, 29 of a T-type carrier are connected to a carrier interface circuit 30.

There are a number of service observing circuits for monitoring individual types of signals, such as "Touch-Tone" receiver 32, MF receiver 34, special information tone receiver 35, and any other form of signaling which may be added. The audio receiver 38 may be used in any type of system, for detecting all trunks busy signaling tones, for example.

The pulse amplitude modulation ("PAM") control circuit 36 receives input signals, assigns input circuits to receive the signals, and sends out digitally modulated signals which may be recorded on a paper tape, or magnetic tape, for example, to make a record of the events as they are being recorded. The PAM control circuit 36 also feeds audio signals to an audio amplifier 40 and a loudspeaker 42 so that the quality of the sound may be monitored. The PAM control circuit 36 also presents signals of all monitored events, such as an appearance of ring back tone, busy tone, call answered, or abandoned conditions, and the like, to the microprocessor 44. The PAM circuit 36 controls the assignment of receivers and mixes audio signals onto PAM bus.

A mini or microprocessor or computer 44 controls the operations of the circuits under the control of a program which is stored in a programmable read only memory ("PROM") 48. The PROM 48 has instructions permanently stored in it. The RAM 46 may be programmed by the customer to modify the permanent instructions in the PROM 48 in order to fit the observation and analysis system to the specific needs of particular telephone systems. The microprocessor 44 has access to a local or remote printer 50 for reading out the conditions represented by the observed signals.

The call completion analysis system of FIG. 2 may also be reached through an associated telephone network, for remote polling. When the call data is collected, it may be stored in a memory 45 so that automatic call-in over line 47 may read that stored data from memory 45, for further processing at a remote location.

In a similar manner, audio signals on the observed T-type carrier channels may be monitored via a connection made at 54 via tip and ring conductors T4, R4 in response to the dialing of a telehpone number at a remote polling location. The data which are used to drive the local printer 50 may also drive through a modem 56 to operate a remote printer or cathode ray display via a polling connection 58 involving conductors T2, R2, T3, R3 which are reached via their own telephone number. Thus, the system provides for both machine and human supervision.

Figure 3:
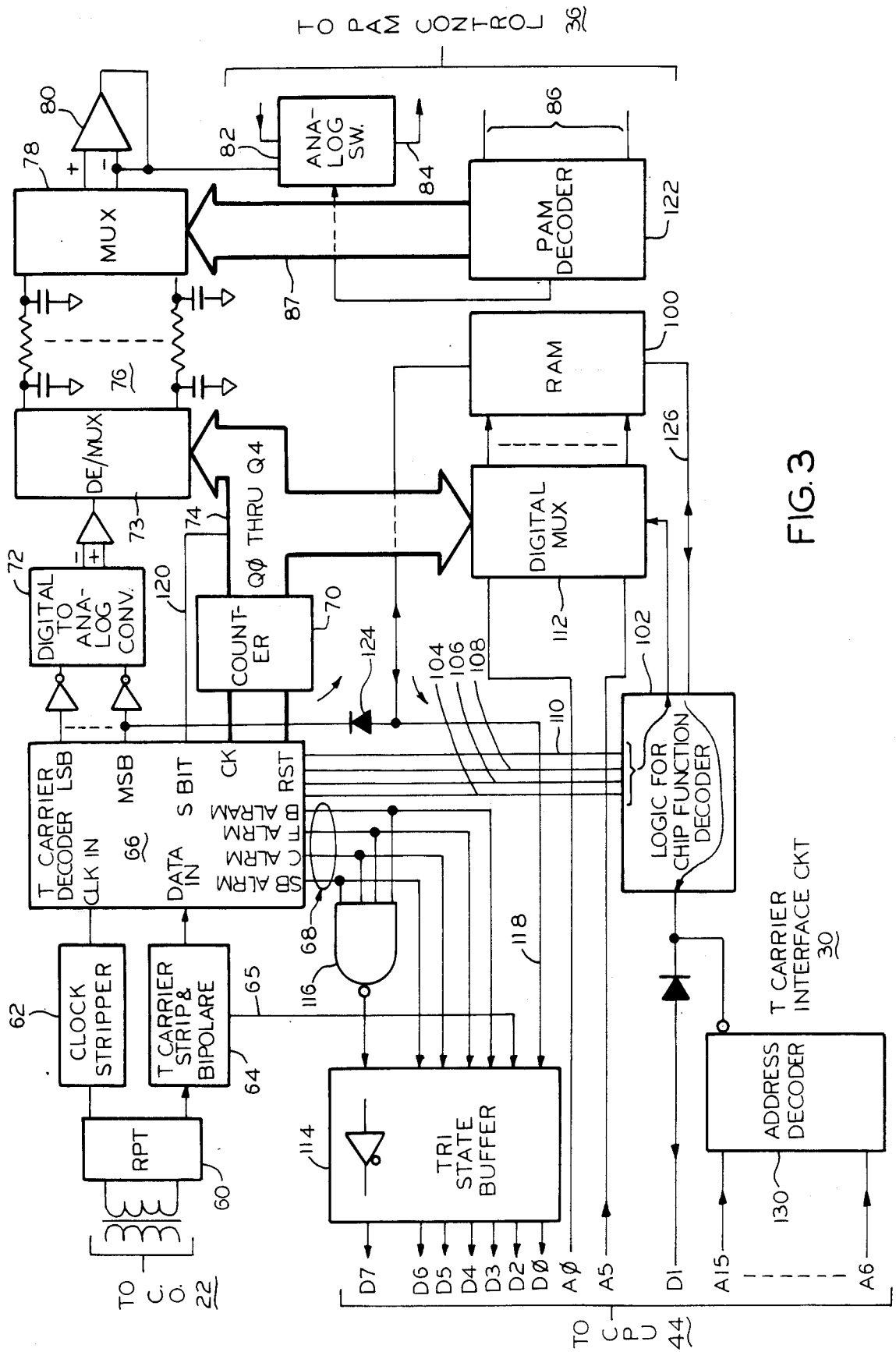
FIG. 3 is a block diagram of the equipment required for the observation of T-type carrier systems.

The details of the T-type carrier interface circuit 30 may become more apparent from a study of FIG. 3. The interconnections between the T-type carrier interface circuit 30 of FIG. 3 and other blocks seen in FIG. 3, are: the connections made at 22 to the monitored telehone channels (a T-type carrier has 24-channels), wires which lead to the CPU 44, and wires which lead to the PAM control unit 36. When connected to a T-type carrier, the signals received at terminal 22 may be a "T-stream" of pulse code modulated signals from each of the twenty-four channels of the T-type carrier. The T-stream is composed of 192 bits of channel information, plus one bit for framing.

The T-type carrier input signals are a series of bipolar pulses appearing at a 1.544 MHZ rate. If the pulses do not follow a rigid schedule of polarity changes, an error is reported. These pulses carry a digital representation of the analog telephone signals, as well as the signaling information.

The incoming signals pass through a wave shaping and repeater circuit 60 which brings all signals to a uniform and prescribed signal strength, reshapes the pulses, and provides isolation between the twenty-four channels. A clock stripper circuit 62 separates the clock signals in the PCM pulse of the T-stream. The remainder (i.e. without the clock signals) of the signals in the T-stream pass through circuit 64. There, an error conductor 65 is marked if these signals do not obey a fixed rule of successive signal polarities (i.e. the pulses must be positive, ground, negative, ground, positive, etc.). If the successive signals do obey that fixed rule, it is highly probable that an error free transmission has occurred.

A decoder 66 responds to the incoming T-stream of carrier signals by separating and decoding them. The various alarm signals (SB, C, F, and BZ) that are used in a T-type carrier system appear at outputs 68. At given times in the sequence of the T-stream, the T-type carrier requires certain signals to have a "high" level and other specific signals to have a "low" level. If this does not happen, there is an "SB alarm" condition. If there is a loss of carrier, there is a "C alarm" condition. If there is a loss of framing synchronization, there is an "F alarm" condition. If there is a failure of the 255-bit in a frame to obey a certain signal rule, there is "BZ alarm" condition. Decoder 66 lights or does not light a pilot lamp depending upon whether an alarm condition exists. This pilot lamp signal may or may not also be used by other equipment depending upon user needs.

In addition, the decoder 66 decodes the individual bits of the binary word carrying the voice message, which bits extend from the least significant bit ("LSB") to the most significant bit ("MSB"). A channel busy or idle condition is indicated by the MSB during every sixth frame. A check bit "CK" and a reset bit "RST" appear at the terminals marked "CK" and "RST".

When the T-stream is received, a counter 70 is started by the S bit as it is forwarded over wire 120. The counter 70 identifies the signals in each successive ones of the 24-channels, as they are received. Since one of those channels is selected for the observation in the manual one-on-one mode, the counter 70 counts down from the S-bit to find the signals on that selected channel. On every frame in the T-stream, the receiver synchronizes the observing circuit with the T-stream by using a framing bit which alternates between 1 and 0 values. When synchronization is achieved, all of the four alarm outputs 68 are low and the various outputs are valid.

The voice information signals (8-bits) are applied to a digital-to-analog converter 72 which reconstitutes the analog voice signals. The resulting analog signal is presented to a demultiplexer 73 which is driven by signals sent from a counter 70 over a data bus 74 in order to select the one of the 24-channels which is to be observed. That is, counter 70 counts down from the S bit to find the selected channel and then commands the DE/MUX circuit 73 to respond to those channel signals. The demultiplexed signals are sampled and stored on capacitors at 76. From there, the signals are remultiplexed by MUX circuit 78 into the signaling format that is used in the call completion analysis system of FIG. 2.

The resulting audio information is then amplified at 80 and switched at 82 onto the PAM bus 84 for processing in a suitable manner by the system of FIG. 2.

The signals returned over busses 86 from the PAM decoder 36 control the multiplexer 78 via data busses 87 and its outflow of data for each channel.

The microprocessor or computer 44 (FIG. 2) observes the four alarm conditions which may occur in the system. The various "D" wires carry signals from the circuits of FIG. 3 to the microprocessor. The various "A" wires carry signals from the microprocessor 44 to the circuits of FIG. 3. The instructions for controlling processor 44 are stored in the programmable read only memory ("PROM") 48 (FIG. 2) and cannot be altered by the user of the system. If the user wishes to alter certain parameters, information may be stored in the random access memory ("RAM") 46, which takes precedence over the instructions stored in the PROM 48. The random access memory ("RAM") 100 (FIG. 2) stores bits to ascertain the busy or idle conditions of the channels.

The logic circuit 102 is controlled by four wires 104, 106, 108, 110 which carry the channel clock signal, the channel synchronizing signal, a write enable signal, and an S-bit signal. The digital MUX circuit 112 decodes the signals on wires A0–A5 to select address locations in the memory of RAM 100, to read out the busy status of the channels.

Tri-state buffer 114 presents the signals (wires 68) on the data bus in response to the command of the microprocessor. The AND gate 116 provides a signal to the tri-state buffer circuit 114 if any one or more of the alarm conditions exists.

The operation of the circuit of FIG. 3 begins with a T-stream comprising a multiplex of twenty-four channels of digital signals from the T-type carrier. The T-stream appears on line 22 in FIG. 3. The repeater 60 brings all pulses in the digital signals to a standard shape and amplitude. Among the T-stream of digital signals are clock signals which are separated by circuit 62 and fed into the decoder 66 for synchronizing purposes. The remaining signals of the T-stream pass through circuit 64. These signals follow a certain rule as to the polarity of successive pulses. If that rule is not followed, conductor 65 is marked on the tri-state buffer 114.

Assuming first that all bits in the T-stream follow the correct polarity rule, wire 65 is not marked. The "S-bit" is separated by and applied from decoder 66 over wire 120 to start the counter 70, which counts up from a starting time to find the signals appearing on the channel which is under observation. When the signals of that channel appear in the T-stream of 24-channels, the digital-to-analog converter 72, demux circuit 73, and mux circuit 78 convert the voice signals into the format that is used by the inventive call observation system. Those signals are then sent through analog switch 82 to be printed or otherwise be recorded in any suitable manner for an analysis of the system operation. Memory 100 will store channel status information that is used for dial pulse and off/on hook signalling. The microprocessor controls the Modem 56 (FIG. 2) and transmits the appropriate information through it. The PAM control 36 sets up line for monitoring calls.

It should be noted that FIG. 2 shows not only the T-stream of signals received over line 22 but also many other types of signals such as "Touch Tone", dial, MF, E and M wire, and the like. These other forms of signals are treated about the same as has been described in connection with the T-stream of signals.

Next, assume that an alarm condition occurs. One or more of the wires 68 are marked to cause an enabling signal to be sent through AND gate 116, the tri-state buffer 114 and over wires D0–D7 to the microprocessor. The microprocessor 44 may be adapted to respond to these signals in any suitable manner. For the present, lighting a pilot lamp for no trouble is sufficient since that indicates the absence of an alarm signal; or, conversely, there is an alarm if the light goes out.

To coordinate the received binary words of the speech signal, a signal is sent from the most significant bit terminal MSB through the diode 124 to the RAM 100 which gives instructional signals over wire 126 to the local logic circuit 102 and over wire 118 to the tristate buffer 114.

The microprocessor 44 takes in the signals via the "D" wires. Depending upon the alarm signal which has occurred, the microprocessor may require any of many different circuits to respond to its instructions. Therefore, it returns address signals to multiplex circuit 112 via coded combination of wires A0–A5 and to an address decoder 130 via a coded combination of wires A6–A15. These signals are decoded and used to control the logic for the chip function decoder 102. The digital multiplex circuit 112 sorts out the signals on wires A0–A5 and applies them to the specific memory locations in the RAM 100.

The inventive system may also be used to verify or to detect billable calls. More particularly, at one time, a telephone company and companies associated with it performed all of the functions necessary to complete a call. When long distance calls were made, the local company directed those calls to its associated common carrier company. The billing would be made from a single central source, and the receipts from those billings would be split along some approved lines between the associated companies which performed the various functions during the long distance call.

Now, a number of other common carriers compete for giving long distance service to the same group of local lines. Therefore, the local telephone company does not always get to see the long distance bills for call made by its customers.

According to the invention, the microprocessor 44 may be programmed to cause a slightly different sequence of operations to occur on calls sent over an extended area trunk to an OCC company in another exchange. More particularly, when a call is originated, equipment at the calling subscriber station 7 (FIG. 1) sends a telephone number which identifies the OCC equipment 12 that is used by that subscriber. Local switching equipment in the calling office 5 forwards the call over an EAS trunk 10 and office 6 to the other common carrier equipment 12. When a call completion signal is returned from the OCC equipment 12, the microprocessor 44 causes the "Touch Tone" receiver 32 (FIG. 2) to be reconnected to the voice path to receive the next "Touch Tone" signals that are sent by the calling subscriber. He dials his identification number which is detected and stored in both the inventive circuit 16 (FIG. 1) and the OCC equipment 12. Then, the subscriber dials the called long distance number, which is also stored in the inventive circuit and in the OCC equipment 12. The inventive circuit (at 16 in FIG. 1) latches onto the call and holds until release supervision is received, thus detecting the billable time of the call.

Thus, three separate numbers have been dialed and stored in the inventive circuit: the number of the other common carrier equipment 16, the calling subscriber identification number, and the called subscriber number. These three numbers are processed and printed out on the printer 50 (FIG. 2).

Standard data processing techniques also enable the data to be sorted and printed out according to any of the three numbers. This way, it is easy for the local telephone company A to find the long distance calls which are being incorrectly routed through its equipment to the extended area trunks 10 and to other common carrier equipment 12, instead of directly through the local telephone company equipment to an OCC, as would be done in office 6, for example.

Once the problem is discovered, it may be corrected. Or, in the alternative, the local company may use data connected by the inventive system to present an appropriate bill to either the other common carrier or the calling subscriber.

By similar procedures, all calls through any common carrier equipment and any and all extended area service calls may be monitored.

Those who are skilled in the art will readily perceive how to modify the invention. Therefore, the appended claims are to be construed to cover all equivalent structures which fall within the true scope and spirit of the invention.

We claim:

1. A passive call completion analysis system comprising means for coupling said system to different kinds of telephone transmission trunks which may use different kinds of signaling, at least one of said equipments being a T-type carrier having a plurality of channels; means for passively monitoring, receiving and analyzing a variety of said different kinds of signals appearing in a telephone system and on at least any selected one of the channels of said T-type carrier without actively participating in the completion of calls being transmitted through said channels; said analyzed signals relating to at least call initiation, dialed numbers, duration of call, call completion, and call abandonment conditions; and means responsive to said passive monitoring for giving supervision for both machine and human observation and for reading out said analyzed signals.

2. A passive call completion analysis system comprising means for coupling said system to different kinds of telephone transmission equipment which may use different kinds of signaling, at least one of said equipments being a T-type carrier having a plurality of channels; means for passively monitoring, receiving and analyzing a variety of signals appearing in a telephone system and on at least any selected one of the channels of said T-type carrier without actively participating in the completion of calls being transmitted through said channels; said analyzed signals relating to at least call initiation, dialed numbers, duration of call, call completion, and call abandonment condition; means responsive to said passive monitoring for giving supervision for both machine and human observation and for reading out said analyzed signals and means for detecting and reporting call dispositions and alarm signals which may appear in a T-stream of signals from a T-type carrier system.

3. The system of claim 2 and means for remotely polling said call completion analysis system to secure a read out of said recorded call records.

4. The system of claim 2 wherein said alarm signals in said T-stream comprises an alarm responsive to a failure of a system to have certain signals at predetermined relatively high or low voltages, a loss of carrier, a loss of frame synchronization, of a failure of a designated bit to obey a given rule and means responsive to such a failure for storing a signal indicating a disposition of a call.

5. The system of claim 2 and means for stripping clock signals from said T-stream, and means responsive to said stripped clock signals for synchronizing the operation of said call completion analysis system with said T-stream.

6. The system of claim 2 and means for detecting a predetermined cyclically recurring bit in said stream of signals for starting a countdown to find said selected one of said channels, and means responsive to said countdown for analyzing the signals in said selected channel.

7. A passive call completion analysis system comprising means for coupling said system to different kinds of telephone transmission equipment which may use different kinds of signaling, at least one of said equipments being a T-type carrier having a plurality of channels; means for passively monitoring, receiving and analysing a variety of signals appearing in a telephone system and on at least any selected one of the channels of said T-type carrier without actively participating in the completion of calls being transmitted through said channels; said analyzed signals relating to at least call initiation, dialed numbers, duration of call, call completion, and call abandonment conditions; means responsive to said passive monitoring for giving supervision for both machine and human observation and for reading out said analyzed signals, said variety of signaling including at least signaling over E and M wires, "Touch Tone", dial pulses, and multi-frequency signals, a separate receiver in said call completion analysis system for analyzing each of said variety of signals, and a common control circuit for responding to the output of each of said receivers.

8. The system of claim 1 wherein said signals may indicate calls to a common carrier, means for monitoring signals sent to said common carrier, means responsive to a completion of said call to said common carrier for connecting said monitoring means to observe said call, and means for storing identification and called number signals as they are transmitted.

9. A passive interface circuit for monitoring signals in at least one T-type carrier channel, said circuit comprising means for passively monitoring and receiving a T-stream of digital pulses without entering into active processing of T-type carrier calls, said T-stream, including cyclically recurring clock pulses and other pulses, means responsive to said monitoring for separating said clock pulses from said other pulses, said separated clock pulses being used as local synchronizing pulses for synchronizing said system, decoder means responsive to said clock pulses and said other pulses for delivering alarm signals responsive to detected abnormalities in said T-stream, and means responsive to said detected abnormalities for storing a record thereof for future analysis.

10. The circuit of claim 9 wherein said alarm signals in said T-stream comprises an alarm responsive to a failure of a system to have certain signals at relatively high or low voltages, a loss of carrier, a loss of frame synchronization, or a failure of a designated bit to obey a given rule and means responsive to any one of said failures for storing a disposition of a call.

11. The circuit of claim 9 and buffer means for forwarding each of said alarm signals as they occur, and means responsive to said alarm signals forwarded in said buffer means for analyzing said abnormalities.

12. The circuit of claim 11 and means responsive to said means for analyzing said abnormalities for encoding signals to be transmitted with said other pulses to indicate said abnormalities as they occur, and means responsive to said encoded signals for driving a printer.

13. The circuit of claim 12 and means for remotely polling said call completion analysis system to secure a read out of said recorded signals.

14. The circuit of claim 8 and means for separating a cyclically recurring bit in said T-stream which represents a start of the channels in said T-stream, and means responsive to said separated bit for counting down to a preselected channel, said other pulses being the signals carried by said preselected pulses.

15. A passive call completion monitoring and analysis circuit comprising a plurality of signal receivers, each of said receivers being dedicated to passively monitoring and detecting signals in a corresponding one of any of a plurality of different signal formats, means responsive to the format of the passively monitored signals received over a voice path for assigning a particular one of said receivers which is dedicated to the format of the received signals for further monitoring the signals appearing on that voice path, and means responsive to detection of those signals by said one of the receivers for indicating the status of call conditions on said voice path for analysis purposes.

16. The system of claim 14 and means responsive to a completion of a call to a terminal identified by a common carrier member for reconnecting said particular one of said receivers to said voice path, and means for recording signals thereafter appearing on said voice path.

17. The system of claim 15 and means for monitoring and recording telephone calls through voice paths assigned to common carriers.

18. The system of claim 15 and means for storing a plurality of call records in a solid-state memory, and means for polling them in bulk form to a remote computer for processing.

19. A call completion analysis circuit coupled to passively monitor an extended area service trunk having access to other common carrier equipment without entering into the processing of signals on said extended area service trunk for other than analysis purposes, said call completion analysis circuit comprising means for monitoring and analyzing signals sent over said extended area service trunk, means for detecting a call completion to said other common carrier equipment, and means responsive to said detection of said call completion for storing at least an identification of said call, a personal identification number, called ones of other common carrier switches, called party's number, and other information required to bill said call.

20. The circuit of claim 19 wherein said other information comprises a calling line identification, a called line identification, and another common carrier identification.

* * * * *